Oct. 8, 1963 — K. H. HANSEN — 3,106,198
SELECTOR CONTROL
Filed Aug. 6, 1959 — 3 Sheets-Sheet 1

INVENTOR.
Kai H. Hansen
BY Hugh L. Fisher
ATTORNEY

Oct. 8, 1963 K. H. HANSEN 3,106,198
SELECTOR CONTROL
Filed Aug. 6, 1959 3 Sheets-Sheet 2

INVENTOR.
Kai H. Hansen
BY
Hugh L. Fisher
ATTORNEY

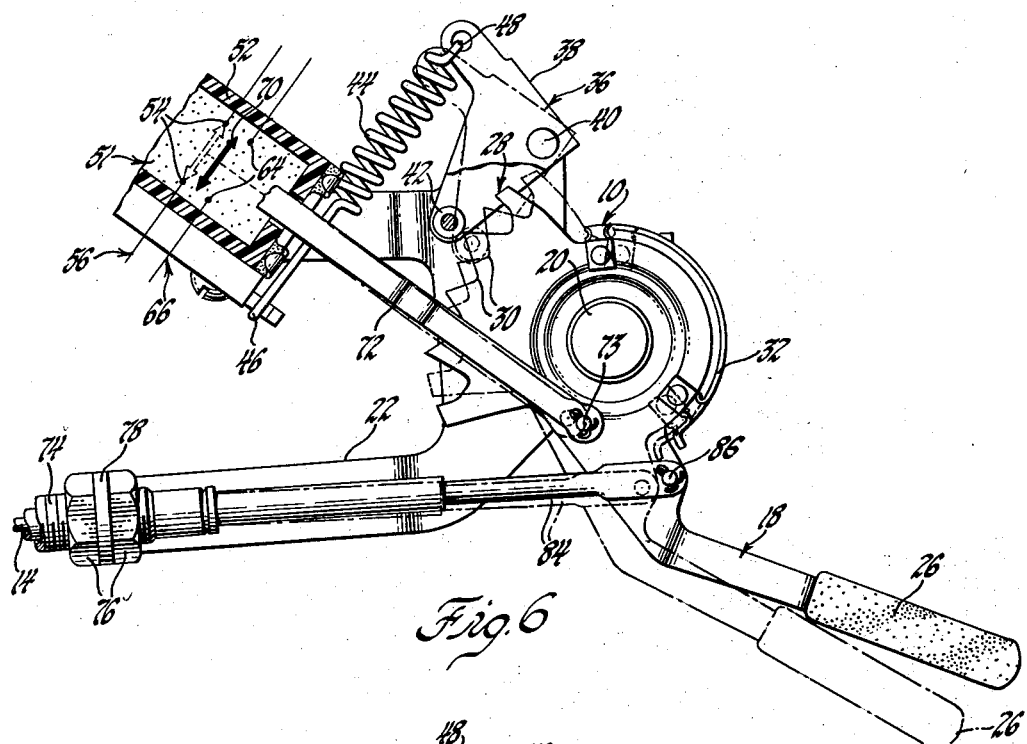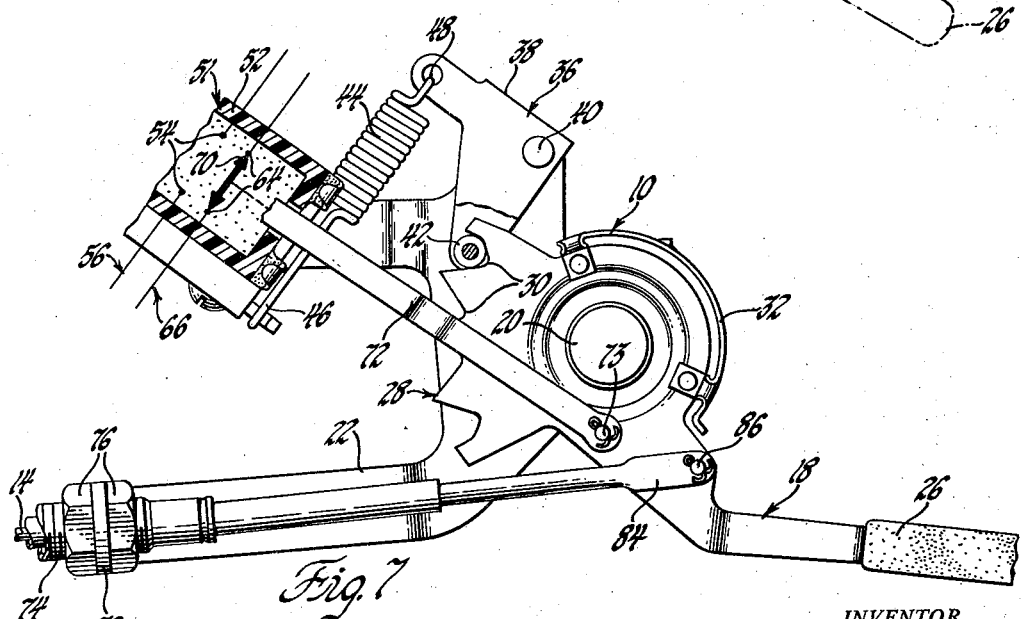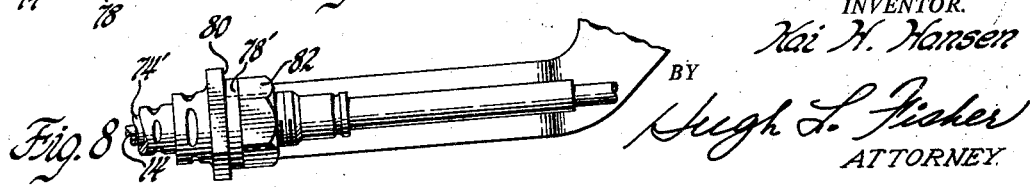

United States Patent Office

3,106,198
Patented Oct. 8, 1963

3,106,198
SELECTOR CONTROL
Kai H. Hansen, Detroit, Mich., assignor to General Motors Corporation, Detroit, Mich., a corporation of Delaware
Filed Aug. 6, 1959, Ser. No. 832,088
5 Claims. (Cl. 123—179)

This invention relates generally to selector controls and particularly to selector controls adapted, although not exclusively, for use with vehicle transmissions.

In general, any selector control that is to be manually maneuverable, such as that for an automatic transmission, should not only be accessbile to the operator but also maneuverable through an uncomplicated pattern, i.e., the movements thereof should be very simple and conventional so as to not require that the operator have special talents or training. Other considerations include fabrication, for the components should be suited for mass production techniques and easily assembled without special attention to exacting dimensional tolerances. Also, cables are preferred to multiple links and levers, both because of the cost and because multiple links and levers produce a tolerance build-up from the summation of errors in each. When replacing these multiple links and levers with a cable, there is concern for slack in the cable and also leverage. Without adequate leverage, of course, undue effort is required for manual operation. Moreover, slack can provide one maneuvering the selector control with a false sensation of particular settings unless provision is made therefor.

With these problems in mind, the invention contemplates a selector control that has a minimum of components easily fabricated and assembled according to accepted mass production techniques without close dimensional control, that is easily manuverable through an uncomplicated pattern to selected settings, that incorporates a novel arrangement for accurately and releasably maintaining each selected setting, and that affords adequate leverage.

More particularly, the invention seeks to provide a selector control that is especially suited for operating a vehicle transmission and that has a detent device directly coacting with the selector member for releasably maintaining chosen settings. Additionally, the selector control has a unique switching arrangement closely associated therewith so as to control plural electric circuits related to certain transmission settings thereof. Moreover, the selector control is suited for installation on a vehicle instrument panel and has a setting indicator movable with the selector member.

Other objects and advantages of the invention will be apparent from the following description and from the accompanying drawings in which:

FIGURE 6 is a view of the selector control demonstrating the selector lever in the neutral setting;

FIGURE 7 is a view of the selector control depicting the selector lever in the reverse setting; and FIGURE 8 is a view of a modification.

Figure 1:
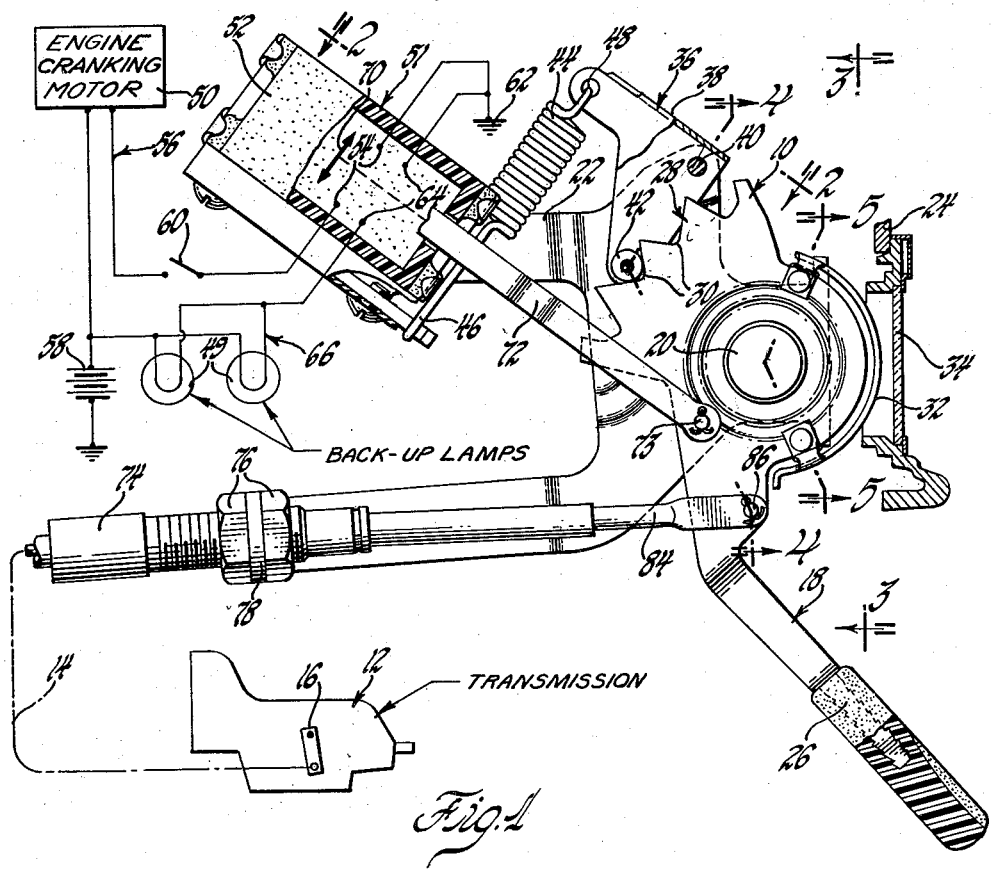
FIGURE 1 is a view of a selector control incorporating the principles of the invention and adapted for operating a vehicle transmission.
Figure 2:
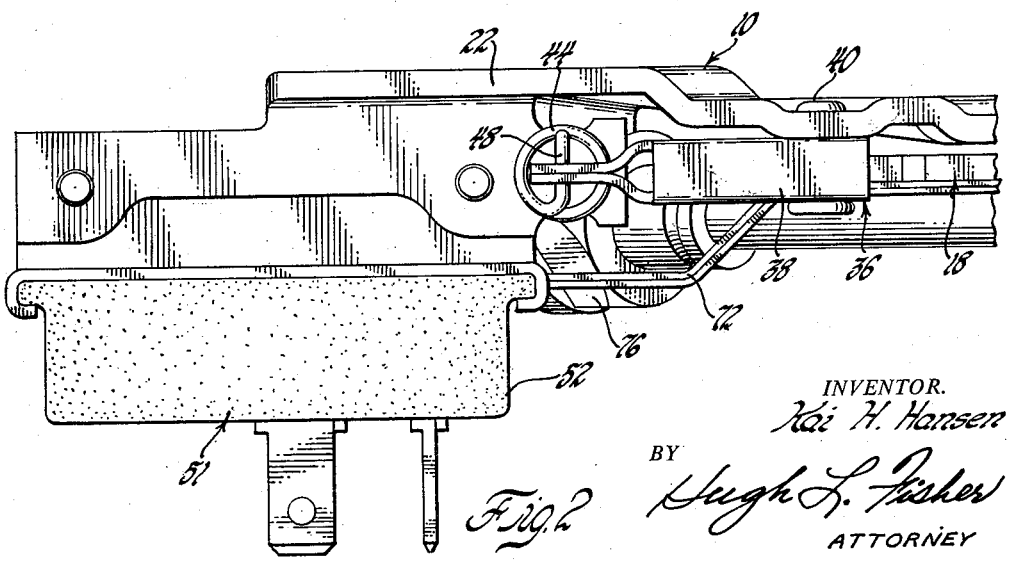
FIGURE 2 is a view of the selector control looking in the direction of arrows 2—2 in FIGURE 1.

Referring to the drawings in detail, the numeral 10 denotes generally a selector control for a transmission 12. The selector control 10 through a cable 14 maneuvers an external lever 16 on the transmission 12, which lever in turn actuates a selector valve (not shown) or the equivalent. In this fashion the transmission is conditioned for different ranges of operation, e.g., low, drive, neutral, and reverse.

Figure 3:
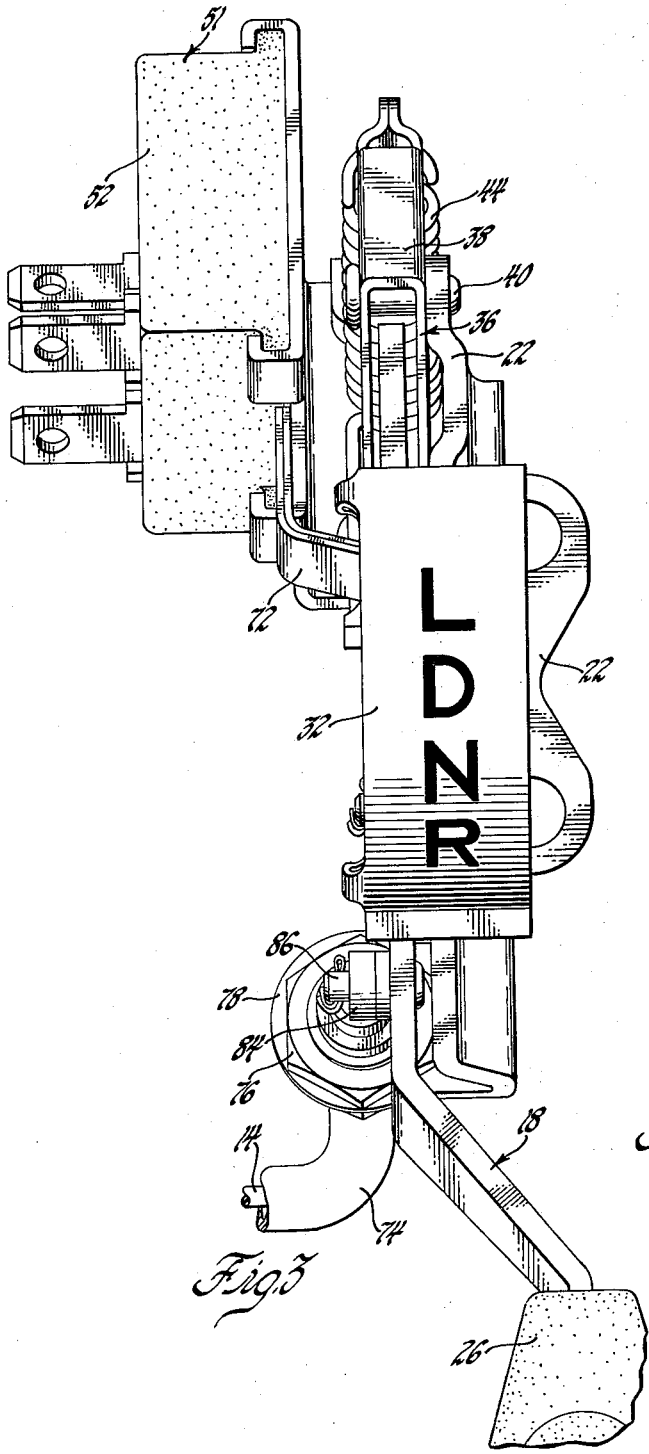
FIGURE 3 is a view of the selector control looking in the direction of arrows 3—3 in FIGURE 1.
Figure 4:
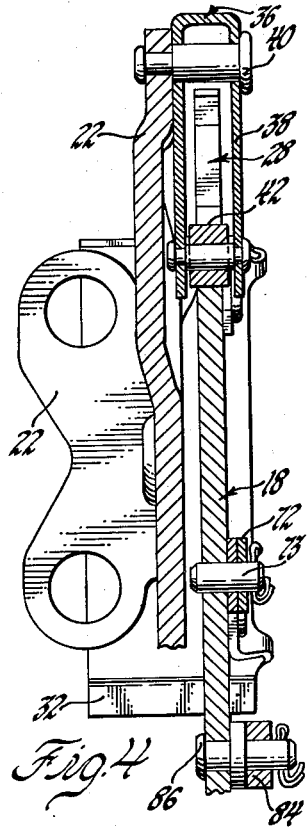
FIGURE 4 is a sectional view of the selector control taken along line 4—4 of FIGURE 1.
Figure 5:
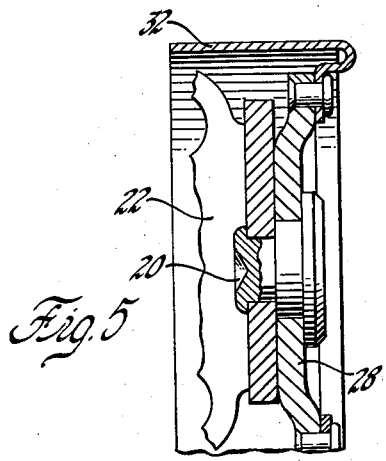
FIGURE 5 is an other sectional view of the selector control taken along the line 5—5 of FIGURE 1.

The selector control 10 comprises a selector lever 18 pivoted at 20 on a mounting bracket 22. The mounting bracket 22 is appropriately installed on a vehicle instrument panel 24 for convenient access to the driver and so that the lever 18 preferably may be moved up and down, i.e., in the vertical plane of the vehicle. For this up and down movement, the selector lever 18 is provided with a handle portion 26, which handle portion 26 is opposite a control surface 28 formed along the edge of the selector lever 18. The control surface 28 has a series of notches 30 that function as stops and that correspond to each of the transmission setting legends displayed on an arcuate indicator plate 32 (see FIGURE 3). The L, D, N, and R legends thereon represent respectively the low, drive, neutral, and reverse transmission settings previously suggested and are adjacent a window 34 or the equivalent in the instrument panel 24. A pointer (not shown) will in a known manner be arranged so as to be opposite one of the legends when the selector lever 18 is in the chosen position thereby indicating visually to the driver the transmission status.

Each of these transmission settings is releasably maintained by a detent device viewed generally at 36 in either of the FIGURES 1, 6 or 7. The detent device 36 employs a carrier 38 pivotally mounted at 40 on the bracket 22 and has revolvably supported on the end adjacent the selector lever control surface 28 a roller 42. For bias, an extension spring 44 is arranged so as to have one end attached at 46 to the bracket 22 and an opposite end joined at 48 to the upper end of the carrier 38. As a result, the spring 44 will urge the carrier 38 in a counter-clockwise direction as viewed about the pivotal point 40 so that as the selector lever 18 is pivoted, the roller 42 will move along the control surface 28 into and out of the notches 30 thereby affording a distinct "feel" to the operator of each transmission setting. Also, the configuration of the extreme end notches corresponding to the low and reverse settings are both such that the roller 42 in coacting therewith will not allow the selector lever 18 to be pivoted in either direction far enough to move the roller 42 out of engagement with the control surface 28.

When the operator selects the desired transmission setting, the detent device 36 will maintain this position, and as the selector lever 18 is moved between settings, the carrier 38 will be advanced in a clockwise direction as seen in FIGURE 6 but without excessive resistance due to the rolling action furnished by the roller 42. By having the detent device 36 so closely associated with the selector lever 18, it can be seen that the "feel" provided the operator can be more easily controlled. If the detent device is disposed elsewhere, for instance on the transmission 12, it is difficult to control the amount of resistance offered thereby inasmuch as there is the necessary leverage to be considered between the selector lever 18 and the transmission external lever 16 as well as the influence of dimensional tolerances and cable slack.

For controlling backup lamps 49 and an engine cranking motor 50, a switch device 51 is also closely related to the selector lever 18 and as depicted in FIGURE 1 includes a body 52 mounted on the bracket 22. The body 52 is provided with two sets of fixed contacts in this embodiment, one set denoted at 54 being for an engine starting circuit 56 extending from, for example, the grounded vehicle battery 58 through the engine cranking motor 50 and an engine starting or motor cranking switch 60 to ground at 62. The other set of fixed contacts are shown at 64 and operate a backup lamp circuit 66 extending also from the vehicle battery 58 through backup lamps 49 and to ground at 62. For closing the sets of contacts 54 and 64, a movable contact member 70 is shifted into and out of engagement with either of the sets of contacts 54 and 64 by a switch actuating arm 72 connected at 73 to the selector lever 18.

As can be observed in FIGURE 7, when the selector lever 18 is in the reverse setting, the switch actuator arm 72 is maneuvered so that the movable contact member 70 thereon engages the contacts 64 thereby completing the backup lamp circuit 66. These backup lamps 49 therefore will be lit any time the transmission selector lever 18 is in the reverse setting. If the selector lever 18 is moved to the FIGURE 6 dotted line position, the contact member 70 engages fixed contacts 54 and will cause the engine starting circuit 56 to be completed whenever engine starting switch 60 is closed. This arrangement is commonly called a neutral safety switch and requires that the transmission selector lever 18 be moved to the neutral setting before the engine can be cranked. This insures that the transmission is not conditioned for drive either forwards or backwards when the engine is started.

With reference to FIGURE 1, provision is made for adjusting the tension of the cable 14, and this is accomplished by moving the cable sheath 74 relative to the bracket 22. As demonstrated, the sheath 74 at the selector control end has a threaded connection with lock nuts 76 positioned on opposite sides of a flange 78 on the bracket 22. By changing this threaded connection, the length of the cable 14 extending from the end thereof can be increased or decreased in a known manner.

If desired, adjustments at the flange 78 can be eliminated by employing the FIGURE 8 construction. This is achieved by accurately maintaining both the position of a flange 78′ with respect to the selector lever settings and the displacement of a shoulder 80 on a cable sheath 74′ relative to the opposite transmission end of the sheath 74′. To attach the sheath 74′ to the bracket 22 only requires that a suitable lock nut 82 threadedly engaging the end of the sheath 74′ be tightened against flange 78′ and no adjustment is needed.

In summary, it is pointed out that the cable 14 has the end 84 thereof pivotally secured at 86 to the selector lever 18 such that substantial leverage is afforded the operator when he maneuvers the selector lever 18 at the handle portion 26. The leverage ratio can easily be altered for any installation simply by changing the lever arms as will be understood by those versed in the art. When the operator revolves the selector 18, the roller 42 will, as explained, move into and out of the notches 30 while offering a minimum resistance and when the desired setting is selected, the roller 42 will be at the base of the corresponding notch at which point maximum restraint is offered. Whenever the selector lever 18 is in either the reverse or neutral setting, the backup lamp circuit 66 or the engine starting circuit 56 will be conditioned for operation by the movement of the contact member 70 into engagement with the related fixed contacts 64 and 54.

From the foregoing it can be seen that the selector lever 18 has a simple up and down movement while utilizing a minimum number of easily fabricated parts that provide adequate leverage for effortlessly operating a cable. To make the unit more compact and facilitate installation along a production assembly line as well as to permit easy subsequent repair, the selector control 10 has both the detent device 36 and switch device 51 closely associated therewith and positioned on the same bracket 22.

The invention is to be limited only by the following claims.

What is claimed is:

1. In a vehicle transmission selector control of a character adapted for installation on a vehicle instrument panel, the combination of a bracket attached to the instrument panel; a selector lever supported on the bracket for revolvable movement to a plurality of transmission settings including a neutral and a reverse setting; the selector having a control surface thereon provided with a series of notches corresponding to each of the transmission settings and an indicator surface having legends thereon representing each setting; the legends on the indicator surface being adjacent a pointer on the instrument panel so as to afford visual indication of each transmission setting; a cable interconnecting the selector lever and the transmission; a detent device for releasably maintaining the selector lever in each of the transmission settings; the detent device including a carrier pivotally mounted on the bracket, a roller element rotatably supported on the carrier adjacent the selector lever control surface, and a spring for biasing the roller element into engagement with selected ones of the notches; and a switch device mounted on the bracket for controlling a plurality of circuits including a vehicle cranking motor circuit having a motor starting switch therein; and a backup light circuit; the switch device including contacts for each circuit and a switch actuator movable by the selector lever and adapted to complete the vehicle cranking motor circuit when the motor starting switch is closed and when the selector lever is in the neutral setting and the backup light circuit when the selector lever is in the reverse setting.

2. In a vehicle transmission selector control of a character adapted for installation on a vehicle instrument panel, the combination of a bracket attached to the instrument panel; a selector lever supported on the bracket for revolvable movement to a plurality of transmission settings; the selector having a control surface thereon provided with a series of notches corresponding to each of the transmission settings and an indicator surface having legends thereon representing each setting; the legends on the indicator surface being adjacent a pointer on the instrument panel so as to afford visual indication of each transmission setting; a cable interconnecting the selector lever and the transmission; a detent device for releasably maintaining the selector lever in each of the transmission settings; the detent device including a carrier pivotally mounted on the bracket, a roller element rotatably supported on the carrier adjacent the selector lever control surface, and a spring for biasing the roller element into engagement with selected ones of the notches; and a switch device mounted on the bracket for controlling a plurality of circuits including a vehicle cranking motor circuit having a motor starting switch therein; and a backup light circuit; the switch device including contacts for each circuit and a switch actuator movable by the selector lever and adapted to complete selected ones of the plurality of circuits when the selector lever is in a related setting, the completion of the vehicle cranking motor circuit also requiring that the motor starting switch be closed.

3. In a vehicle transmission selector control of a character adapted for installation on a vehicle instrument panel, the combination of a bracket, a selector lever supported on the bracket for pivotal movement to a plurality of settings; a transmission; a cable interconnecting the selector lever and the transmission to provide selective transmission control; the selector lever having a control surface thereon provided with a series of notches corresponding to each of the settings, a detent device mounted on the bracket and arranged so as to releasably maintain the selector lever in each of the settings; the detent device including a detent element biased into engagement with selected ones of the control surface notches; and a switch device mounted on the bracket and arranged so as to control a plurality of circuits related to the selector lever settings; the switch device including a switch actuator movable by the selector lever and adapted to complete selected ones of the plurality of circuits when the selector lever is in a related setting.

4. In a vehicle transmission selector control of a character adapted for installation in a vehicle instrument panel, the combination of a transmission; a bracket; a selector lever supported on the bracket for pivotal movement to a plurality of settings; a cable interconnecting the selector lever and the transmission to provide selective transmission control; the selector lever having a control surface thereon provided with a series of notches corresponding to each of the settings; a detent device for releasably maintaining the selector lever in each of the settings; the detent device including a carrier pivotally mounted on the bracket, a roller element rotatably supported on the carrier adjacent the selector lever control surface, and a spring for biasing the roller element into engagement with selected ones of the control surface notches; and a switch device mounted on the bracket and arranged so as to control a plurality of circuits related to the selector lever settings, the switch device including contacts for each circuit, and a switch actuator movable by the selector lever into engagement with the contacts so as to complete selected ones of the plurality of circuits when the selector lever is in a related setting.

5. In a vehicle transmission selector control of a character adapted for installation on a vehicle instrument panel, the combination of a transmission, support means, a selector member mounted on the support means for movement to a plurality of settings, a cable interconnecting the selector member and the transmission to provide selective transmission control, the selector member having a control surface thereon, detent means mounted on the support means for releasably maintaining each of the settings, the detent means including a detent element arranged so as to be biased into engagement with the selector member control surface and establish each setting, and switch means mounted on the support means, the switch means being arranged for controlling a plurality of circuits relating to each of the selector member settings, the switch means also including an actuator movable by the selector member for completing selected ones of the plurality of circuits.

References Cited in the file of this patent

UNITED STATES PATENTS

| | | |
|---|---|---|
| 1,793,010 | Randol | Feb. 17, 1931 |
| 2,068,110 | Pfaff | Jan. 19, 1937 |
| 2,319,503 | Glogau | May 18, 1943 |
| 2,511,054 | Ferguson et al. | June 13, 1950 |
| 2,530,541 | Roth | Nov. 21, 1950 |
| 2,612,051 | Felt | Sept. 30, 1952 |
| 2,700,362 | Calling | Jan. 25, 1955 |
| 2,778,229 | Simpson et al. | Jan. 22, 1957 |
| 2,784,280 | Hastings | Mar. 5, 1957 |
| 2,884,802 | Loofbourrow | May 5, 1959 |
| 2,887,898 | Jovanovich | May 26, 1959 |
| 2,902,882 | Schwinn | Sept. 8, 1959 |
| 2,939,447 | Lucas et al. | June 7, 1960 |
| 2,943,501 | Stapleton | July 5, 1960 |
| 2,964,964 | Craig | Dec. 20, 1960 |
| 2,968,195 | Edgley | Jan. 17, 1961 |

FOREIGN PATENTS

| | | |
|---|---|---|
| 209,095 | Australia | Dec. 20, 1956 |